United States Patent
Stover et al.

(10) Patent No.: US 7,540,131 B2
(45) Date of Patent: Jun. 2, 2009

(54) GROUND SPEED CONTROL SYSTEM WITH HILL ASSIST, CRUISE CONTROL AND LOCKOUT LEVER

(75) Inventors: Dale A. Stover, Plymouth, MN (US); Kevin D. Docken, Chanhassen, MN (US); Thomas G. Mayer, Buffalo, MN (US)

(73) Assignee: The Toro Company, Bloomington, MN (US)

( * ) Notice: Subject to any disclaimer, the term of this patent is extended or adjusted under 35 U.S.C. 154(b) by 648 days.

(21) Appl. No.: 10/942,625

(22) Filed: Sep. 16, 2004

(65) Prior Publication Data

US 2006/0053763 A1  Mar. 16, 2006

(51) Int. Cl.
*A01D 69/00* (2006.01)

(52) U.S. Cl. .................................. 56/10.8; 180/19.3

(58) Field of Classification Search ............... 180/19.3, 180/6.48, 332, 333, 334, 338; 74/471 R, 74/469, 526; 56/10.8, 16.7
See application file for complete search history.

(56) References Cited

U.S. PATENT DOCUMENTS

| | | | |
|---|---|---|---|
| 2,601,752 A | | 7/1952 | Rose |
| 5,701,967 A | * | 12/1997 | Barnard .................... 180/19.3 |
| 6,082,083 A | | 7/2000 | Stalpes et al. |
| 6,105,348 A | * | 8/2000 | Turk et al. ................... 56/10.5 |
| 6,161,637 A | * | 12/2000 | Decker et al. .............. 180/6.48 |

\* cited by examiner

*Primary Examiner*—Árpád Fábián Kovács
(74) *Attorney, Agent, or Firm*—James W. Miller (57) ABSTRACT

A ground speed control system for an outdoor power equipment unit comprises a slidable handle grip that moves up and down on a handle to decrease and increase the ground speed, respectively. A pivotal control lever is provided on the handle grip. The pivotal lever includes a toothed sector gear. A toothed rack is fixed to the handle. Normally, the sector gear and toothed rack are out of engagement with each other during sliding motion of the handle grip. However, if the operator pivots the control lever to engage the sector gear with the rack, cooperation between the teeth of the sector gear and the teeth of the rack will move the slidable handle grip further down the handle to provide a temporary speed increase and will also lock the handle grip to the handle to provide cruise control capability. The handle grip is U-shaped and has two legs telescopically received inside the open upper ends of a pair of spaced handle tubes.

22 Claims, 8 Drawing Sheets

GROUND SPEED CONTROL SYSTEM WITH HILL ASSIST, CRUISE CONTROL AND LOCKOUT LEVER

TECHNICAL FIELD

This invention relates to an outdoor power equipment unit, such as a walk behind lawn mower, having a self propel system for moving the unit over the ground at a variable ground speed. More particularly, this invention relates to a control system by which the operator manually controls the ground speed.

BACKGROUND OF THE INVENTION

Walk behind lawn mowers are well known outdoor power equipment units for mowing grass. Such mowers comprise a movable housing having a cutting chamber that carries a substantially horizontal rotary cutting blade. A handle extends upwardly and rearwardly from the housing. An operator grips a handle grip on the handle and walks behind the mower to guide and control the mower.

Many walk behind lawn mowers have a self propel system that propels or drives the mower at a variable ground speed. In such mowers, some type of control system is carried on the handle to allow the operator to engage and disengage the self propel system and to select a desired ground speed. Many such control systems utilize a pivotal ground speed control bail on the handle of the mower. The bail can be pivoted from an open position towards a closed position to engage the self propel system. In some control systems, the degree of closure of the ground speed control bail determines the ground speed of the mower.

U.S. Pat. No. 6,082,083 to Stalpes et al., assigned to The Toro Company, the assignee of this invention, discloses a different control system for operating the self propel system of a mower or the like. The control system of the 083 patent includes a handle grip on the handle that slides up and down relative to a lower portion of the handle. As the handle grip slides down, the mower ground speed increases. As the handle grip slides up, the mower ground speed decreases.

The slidable handle grip of the 083 patent automatically adjusts the ground speed of the mower to the walking speed of the operator. If the operator walks faster, the operator naturally pushes somewhat harder on the handle grip, thereby sliding it further down which increases the mower ground speed. Conversely, if the operator walks slower, the operator naturally pushes with less force on the handle grip, which allows the handle grip to rise thereby decreasing the mower ground speed. This control system has been commercially successful in the Personal Pace line of Toro lawn mowers and the Easy Stride line of Lawn Boy lawn mowers.

In the control system of the 083 patent, the handle grip comprises a transverse cross bar, two downwardly extending legs, and an escutcheon plate all integrally molded as a single piece out of plastic. The legs of the handle grip telescopically slide over the outer diameter of the upper ends of the handle tubes of the handle. Plastic slide bushings are placed between the handle tubes and the handle grip to prevent wear on the legs of the handle grip. A separate control bail is pivotally mounted on the handle grip for controlling the operation of the blade by allowing operation of the engine.

While the above described handle grip is effective, it is somewhat complex and involves numerous components. A simpler structure for the handle grip and for slidably mounting the handle grip on the handle would be desirable for cost reduction.

In addition, when using the control system of the 038 patent, one phenomenon that has been observed is a tendency for the mower to slow down. The operator can compensate for this by pushing in harder on the slidable handle grip. But, this requires the operator to consciously adjust the position of the handle grip. It would be desirable to provide the operator with the ability to temporarily and selectively increase the mower ground speed without having to do so through direct manipulation of the slidable handle grip itself. However, this has not heretofore been possible.

Finally, even when travelling on flat terrain, the slidable handle grip of the 038 patent can result in uneven ground speed for some operators due to an inconstant pushing force on the slidable handle grip. Moreover, once an operator finds a position of the slidable handle grip that produces a mower ground speed that is to the operator's liking, the operator must pay close attention to keeping the handle grip in that same position to keep the ground speed constant. It would be desirable to have some way of establishing and maintaining a constant position of the slidable handle grip to provide a cruise control. Again, this was not possible prior to this invention.

SUMMARY OF THE INVENTION

One aspect of this invention relates to an improved outdoor power equipment unit having a self propel system for propelling the outdoor power equipment unit at a variable ground speed. The outdoor power equipment unit includes a ground speed control system comprising a handle grip that moves in opposed directions for increasing and decreasing, respectively, the speed provided by the self propel system. The outdoor power equipment unit also comprises a control other than the handle grip. The control is selectively actuated by an operator for further advancing the movable handle grip in the speed increasing direction of movement thereof to temporarily increase the ground speed as long as the control remains actuated.

Another aspect of this invention relates to an improved outdoor power equipment unit having a self propel system for propelling the outdoor power equipment unit at a variable ground speed. The outdoor power equipment unit includes a ground speed control system comprising a handle grip that is gripped by an operator to guide the outdoor power equipment unit. The handle grip is movable for controlling the ground speed. The handle grip has a neutral position in which the self propel system is not engaged. The handle grip can be moved by the operator out of the neutral position into a plurality of advanced drive positions in which the self propel system is engaged and the ground speed increases depending on how far a particular drive position is advanced from the neutral position. A control is provided for locking the movable handle grip in a drive position thereof to permit an operator to establish a cruise control setting that maintains a substantially constant ground speed.

Yet another aspect of this invention relates to an improved outdoor power equipment unit having a self propel system for propelling the outdoor power equipment unit at a variable ground speed. The outdoor power equipment unit includes an upwardly extending handle having a handle grip that is gripped by an operator to guide the outdoor power equipment unit. A ground speed control system is provided in which the handle grip slides up and down on the handle to decrease and increase, respectively, the ground speed. The improvement relates to the ground speed control system and comprises a first toothed member on the handle grip. A second toothed member is provided on the handle. The toothed members are normally disengaged from one another as the operator slides the handle grip up and down on the handle. The toothed members are selectively engageable with one another and rotatable relative to one another by the operator to further slide the handle grip down the handle.

An additional aspect of this invention relates to an improved outdoor power equipment unit as described in the foregoing paragraph. A pivotal lever is carried on the handle grip with the pivotal lever having a set of teeth thereon. A toothed rack is carried on the handle with the teeth on the rack and the teeth on the lever facing one another, the teeth on the rack and the teeth on the lever being configured to mate with one another. The pivotal lever has a non-operative position in which the teeth on the pivotal lever are displaced from the teeth on the rack as the operator slides the handle grip up and down on the handle. The operator can selectively pivot the lever on the handle grip into an operative position as the operator slides the handle grip up and down on the handle with pivotal motion of the lever moving the teeth on the lever into engagement with the teeth on the rack such that the teeth on the lever and on the rack cooperate with one another to provide an additional influence on movement of the handle grip.

One further aspect of this invention relates to an improved outdoor power equipment unit having a self propel system for propelling the outdoor power equipment unit at a variable ground speed. The outdoor power equipment unit includes an upwardly extending handle having a handle grip that is gripped by an operator to guide the outdoor power equipment unit. A ground speed control system is provided in which the handle grip slides up and down on the handle to decrease and increase, respectively, the ground speed. The ground speed control system comprises a pair of spaced handle tubes having open upper ends. The handle grip is generally U-shaped with a transverse cross bar and two downwardly extending legs. The legs of the handle grip have lower ends which are telescopically received inside the open upper ends of the handle tubes. A pair of compression springs are received inside the open upper ends of the handle tubes and surround the lower ends of the legs of the handle grip for biasing the handle grip upwardly relative to the handle tubes.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

This invention relates to a ground speed control system for an outdoor power equipment unit. One embodiment of a ground speed control system according to this invention is illustrated generally as 2 in FIG. 1. One embodiment of an outdoor power equipment unit that can utilize control system 2 is the walk behind lawn mower illustrated generally as 4 in FIG. 1. Control system 2 may be used with other types of outdoor power equipment units that have a self propel system for propelling the unit over the ground at a variable ground speed.

Control system 2 of this invention is an improvement of the slidable handle grip type control system disclosed in U.S. Pat. No. 6,082,083, assigned to The Toro Company, the assignee of this invention. U.S. Pat. No. 6,082,083 is hereby incorporated by reference for teaching certain details of mower 4 and of the operation of control system 2. The reader is referred to the 083 patent for such details. For the purposes of this application, the reader need only understand that mower 4 is equipped with a self propel system that drives or propels mower 4 over the ground at a variable ground speed. Control system 2 engages and disengages the self propel system and selects a particular mower ground speed through the position of a slidable handle grip 6 on a handle 8 of mower 4.

Handle 8 extends upwardly and rearwardly from mower 4 to allow an operator to walk behind mower 4. The operator can grip and hold handle grip 6 to guide and operate mower 4. Handle 8 can have many forms. However, handle 8 preferably comprises a pair of spaced handle tubes 10.

Figure 1:
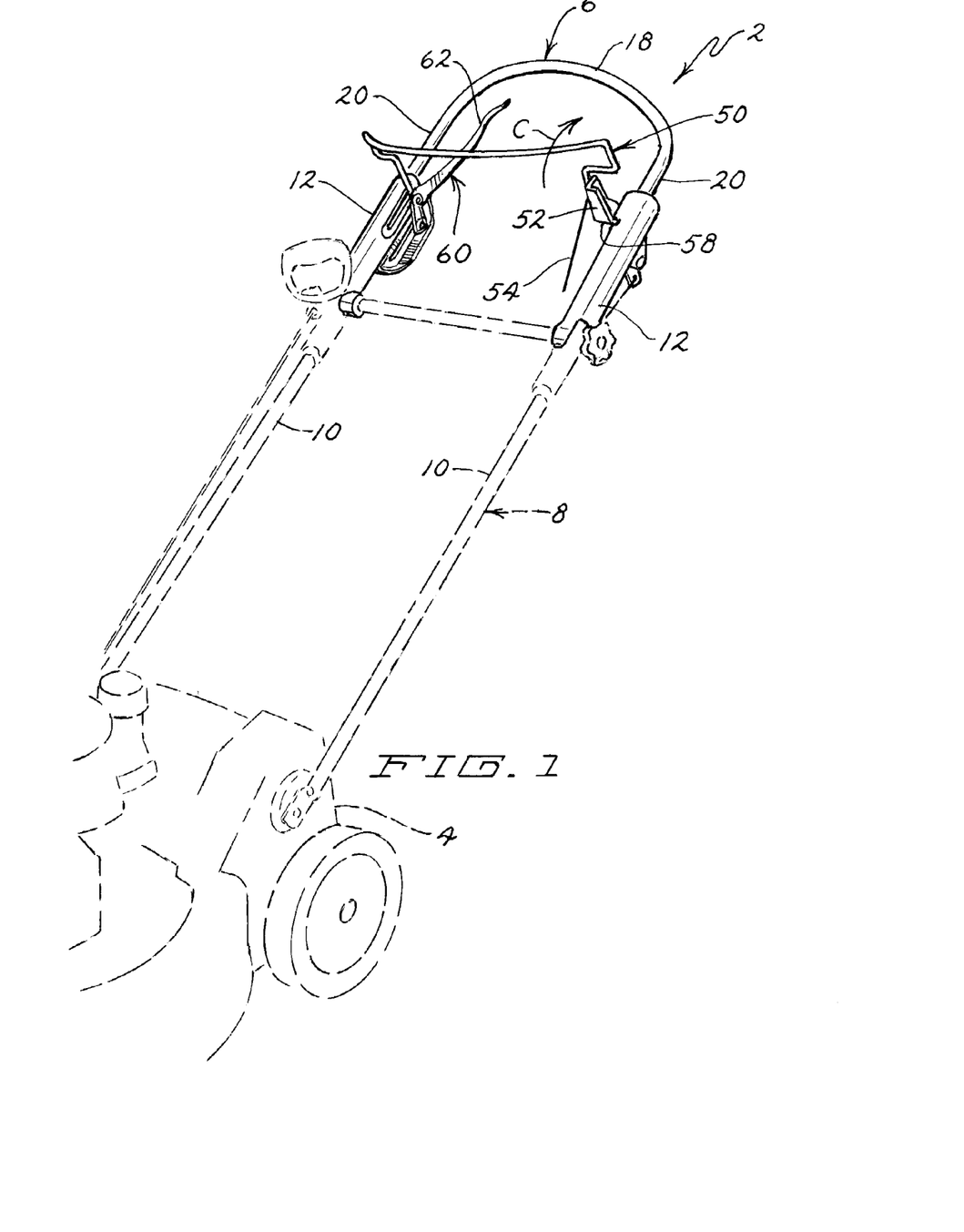
FIG. 1 is a perspective view of an outdoor power equipment unit, such as a walk behind lawn mower, equipped with one embodiment of a ground speed control system according to this invention.
Figure 4:
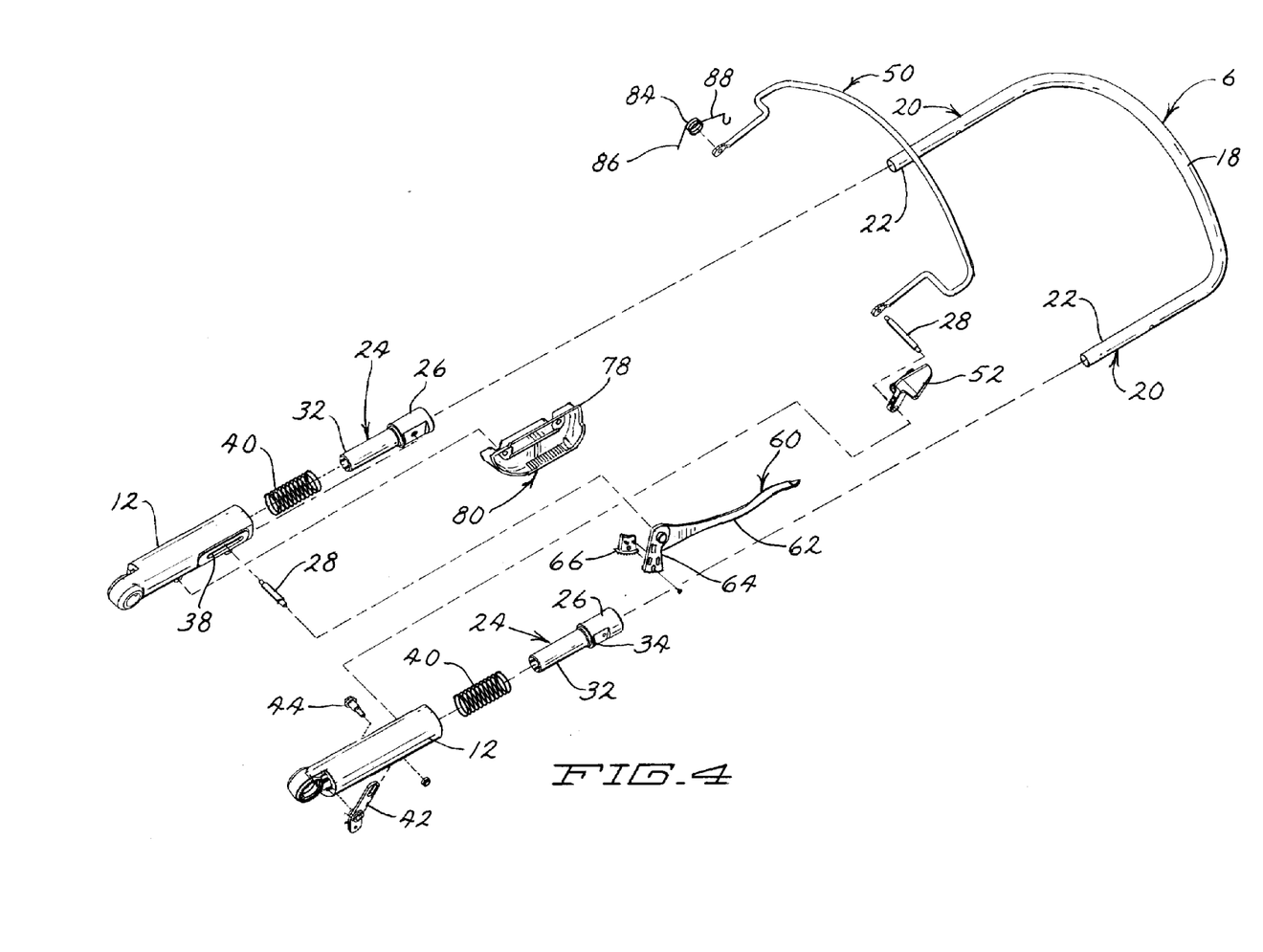
FIG. 4 is an exploded view of the ground speed control system of FIG. 1.

Handle tubes 10 have generally cylindrical, hollow upper ends 12. Upper ends 12 are open at the top 14 and have a closed bottom 16. See FIG. 5. As shown in FIGS. 1 and 4, handle grip 6 is U-shaped having a transverse cross bar 18 that connects the upper ends of two downwardly extending legs 20. The lower end 22 of each leg 20 of handle grip 6 is slidably received inside upper end 12 of one handle tube 10 to slidably mount handle grip 6 on handle 8. Preferably, handle grip 6 is integrally formed of a metallic material.

Figure 5:
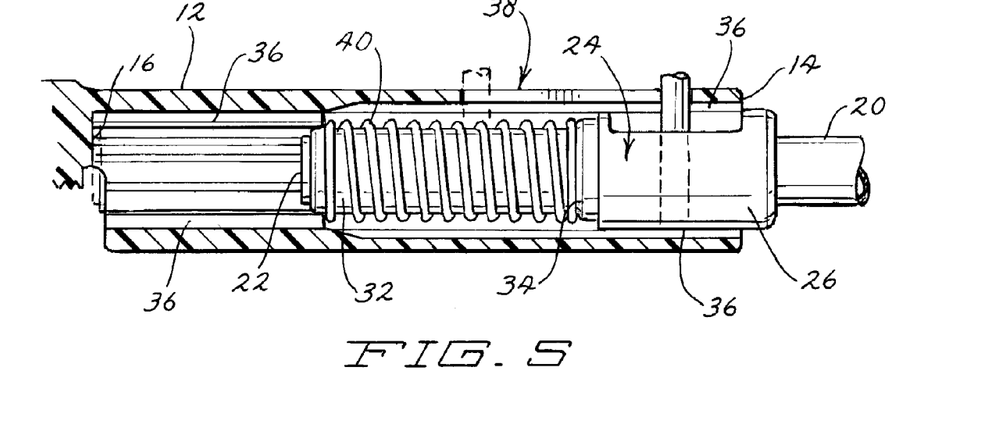
FIG. 5 is a cross-sectional view of the ground speed control system of FIG. 1 taken along lines 5-5 in FIG. 2, particularly illustrating the telescopic mounting of one of the legs of the slidable handle grip within one of the handle tubes of the handle.
Figure 6:
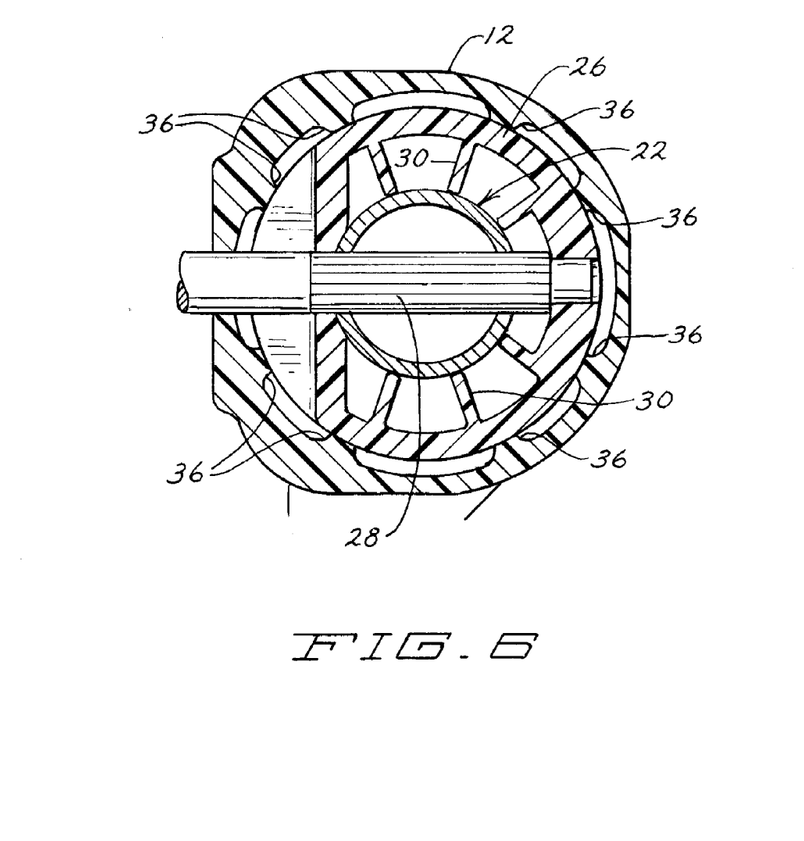
FIG. 6 is a cross-sectional view of the ground speed control system of FIG. 1 taken along lines 6-6 in FIG. 2, further illustrating the telescopic mounting of one of the legs of the slidable handle grip within one of the handle tubes of the handle as well as the pivot pin used for pivotally mounting the pivotal control lever and one side of the blade control bail to the slidable handle grip.

As shown in FIGS. 4-6, lower end 22 of each leg 20 of handle grip 6 passes through and is fixed to a plastic guide sleeve 24. Guide sleeve 24 includes a cylindrical hub 26 that mounts a transversely extending pivot pin 28. Pivot pin 28 passes through both guide sleeve 24 and lower end 22 of one leg 20 of handle grip 6 to fix guide sleeve 24 to leg 20. Lower end 22 of leg 20 of handle grip 6 is centered within guide sleeve 24 by a plurality of inwardly extending centering ribs 30 on guide sleeve 24. See FIG. 6.

Guide sleeve 24 carried on lower end 22 of each leg 20 of handle grip 6 further includes a hollow cylindrical stem 32 that extends further downwardly from cylindrical hub 26. Stem 32 has a slightly smaller outer diameter than the outer diameter of cylindrical hub 26 such that an annular shoulder 34 is formed between the junction of stem 32 and hub 26. Upper ends 12 of handle tubes 10 include a plurality of longitudinal, circumferentially spaced guide ribs 36 that engage against the outer diameters of both hub 26 and stem 32 to help guide the sliding movement of each leg 20 of handle grip 6 within upper ends 12. See FIGS. 5 and 6. Preferably, at least those portions of handle tubes 10 that form upper ends 12 are also formed of plastic so each plastic guide sleeve 24 slides on another plastic member to have a plastic on plastic sliding interface.

Each pivot pin 28 carried by lower end 22 of each leg 20 of handle grip 6 sticks out through an elongated slot 38 placed in the inner side of the upper end 12 of one handle tube 10. A compression spring 40 is received around stem 32 of guide sleeve 24. One end of compression spring 40 bears against shoulder 34 on guide sleeve 24 and the other end of compression spring 40 bears against one end of some of the guide ribs 36. Thus, compression springs 40 are effective to normally bias handle grip 6 upwardly relative to handle tubes 10 until each pivot pin 28 engages against the upper end of each slot 38. In this position of handle grip 6, the self propel system is disengaged and the ground speed of mower 4 is zero. This is the solid line position shown in FIG. 7.

Figure 7:
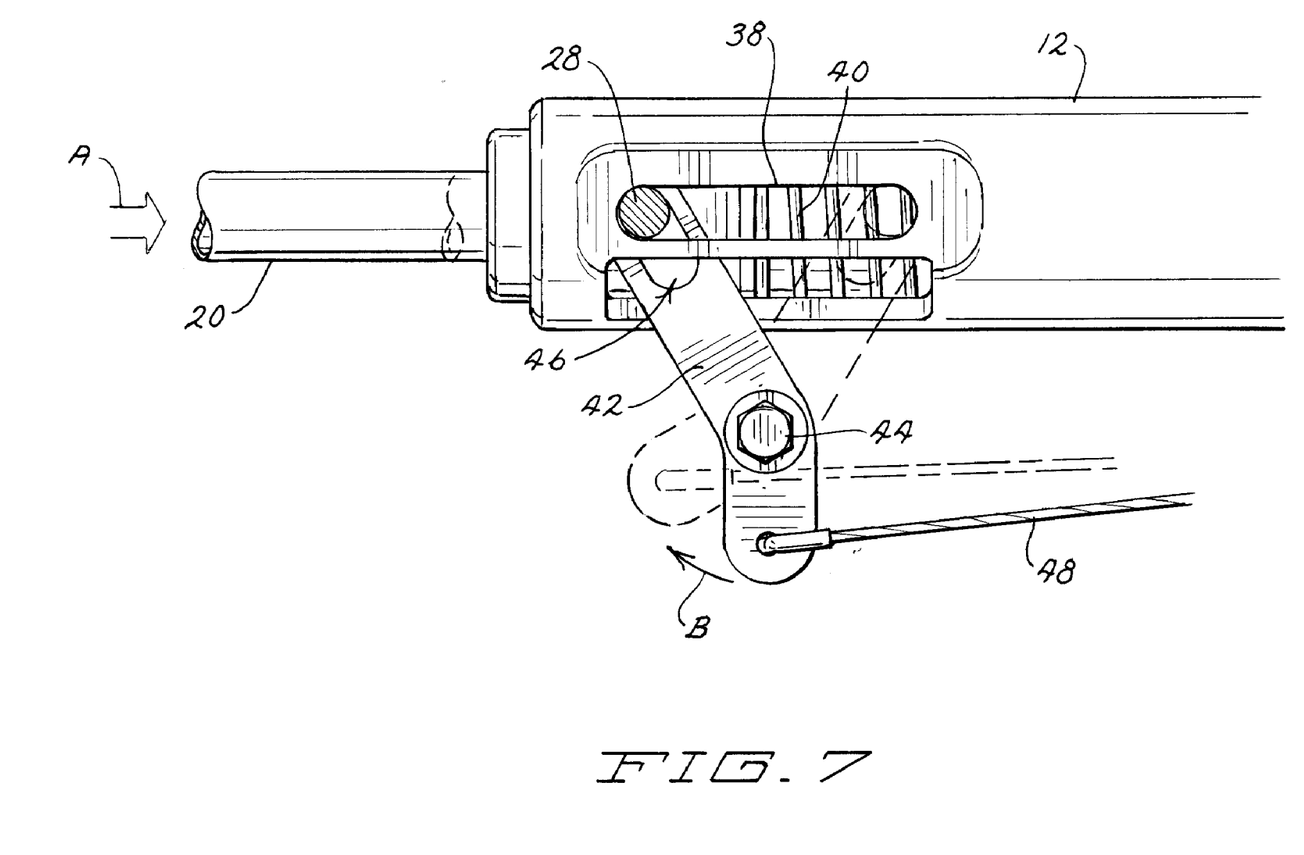
FIG. 7 is a side elevational view of a portion of the ground speed control system of FIG. 1, particularly illustrating the motion of the slidable handle grip on the handle and the pulling of the cable that operates the self propel system at a selected speed.

When the operator grips handle grip 6 and walks forward at a desired pace, the operator will push in or downwardly on handle grip 6 to slide handle grip 6 downwardly relative to handle tubes 10 as indicated by the arrow A in FIG. 7. A rotatable link 42 is pivotally attached to one handle tube 10 by a pivot bolt 44 as shown in FIGS. 4 and 7. The upper end of link 42 passes upwardly into the upper end 12 of handle tube 10. The upper end of link 42 has a slot 46 to receive pivot pin 28 carried by lower end 22 of leg 20 of handle grip 6 as pivot pin 28 passes outwardly through slot 38 in the inner side of upper end 12 of handle tube 10. A control cable 48 is attached to the lower end of link 42 and to the self propel system of mower 4.

When handle grip 6 slides down on handle tubes 10, pivot pin 28 will push forwardly or downwardly on link 42 to pivot the lower end of link 42 rearwardly as shown by the arrow B in FIG. 7. This pulls or retracts control cable 48 connected to the self propel system to both engage the self propel system and then to progressively increase the ground speed of mower 4. The harder the operator pushes on handle grip 6 and the further down pivot pin 28 slides in slot 38, the more control cable 48 is pulled to the rear and the faster the ground speed of mower 4. This continues until pivot pin 28 bottoms out on the lower end of slot 38 in handle tube 10 which provides the maximum ground speed of mower 4. This is the phantom line position of FIG. 7. Slot 46 in link 42 accommodates the rise and fall in link 42 relative to pivot pin 28 as link 42 pivots over center during its full range of motion as illustrated in FIG. 7.

A U-shaped blade control bail 50 is pivotally connected to handle grip 6 by being mounted on the ends of pivot pins 28 carried by lower ends 22 of legs 20 of handle grip 6. In other words, after each such pivot pin 28 passes outwardly through slot 38 in corresponding handle tube 10, pivot pins 28 are long enough so that legs 20 of blade control bail 50 can be pivotally journalled thereon. In addition, on one side of blade control bail 50, a bail stop 52 is also pivotally journalled on one of pivot pins 28 adjacent one leg of blade control bail 50. See FIGS. 3 and 4. Bail stop 52 connects to a control cable 54 that is operatively connected to an engine kill switch or blade brake clutch system (BBC) on mower 4.

Figure 3:
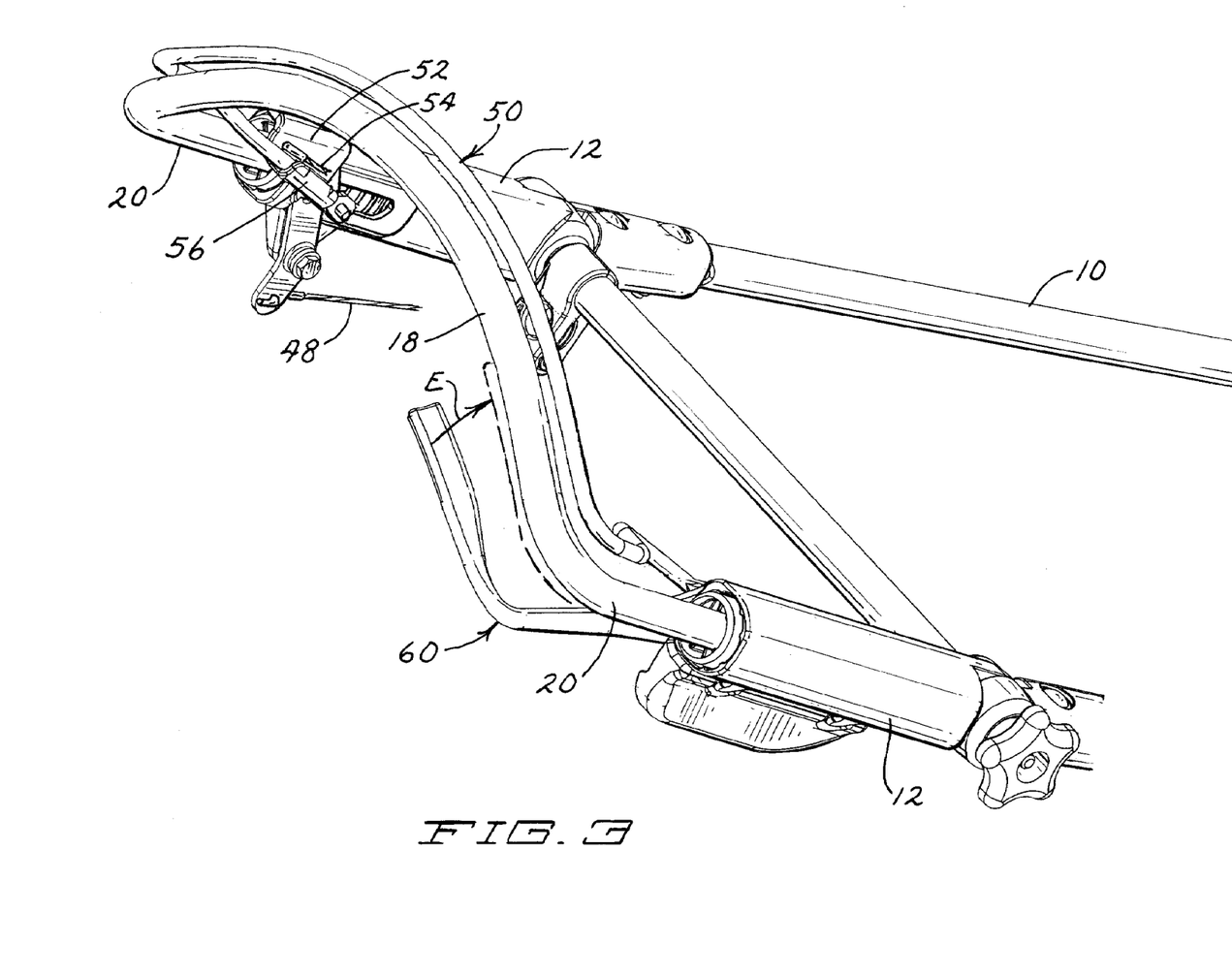
FIG. 3 is an enlarged perspective view similar to FIG. 2, but showing the ground speed control system from the rear and looking in the opposite direction from the direction in FIG. 2.

Bail stop 52 is generally L-shaped and includes an upwardly facing U-shaped clip 56 which receives one leg of blade control bail 50 with a snap fit. This snap fit fixes bail stop 52 to blade control bail 50 so that bail stop 52 moves with blade control bail 50. When blade control bail 50 is in its disengaged position, an edge 58 of bail stop 52 abuts against the top of handle tube 10 to define the disengaged position of blade control bail 50 as shown in FIG. 1. When blade control bail 50 has been pivoted in the direction of the arrow C in FIG. 1 to close blade control bail 50 against cross bar 18 of handle grip 6, bail stop 52 then simply closely overlies the top of handle tube 10 as shown in FIG. 3. This is the engaged position of blade control bail 50.

Pivoting blade control bail 50 between its disengaged and engaged positions is necessary to allow operation of the blade of mower 4. Such pivoting will pull control cable 54 rearwardly to actuate some component on mower 4 that is related to blade operation. For example, in a zone start lawn mower, moving blade control bail 50 to its engaged position closes an engine kill switch to allow the engine to be started which causes the blade to rotate. If the operator releases blade control bail 50 and such bail returns to its disengaged position, the engine kill switch will be opened to stop the engine and thereby stop rotation of the blade. In a BBC lawn mower, control cable 54 will engage and disengage a clutch that places the blade into and out of operation while the engine runs continuously once started.

Figure 2:
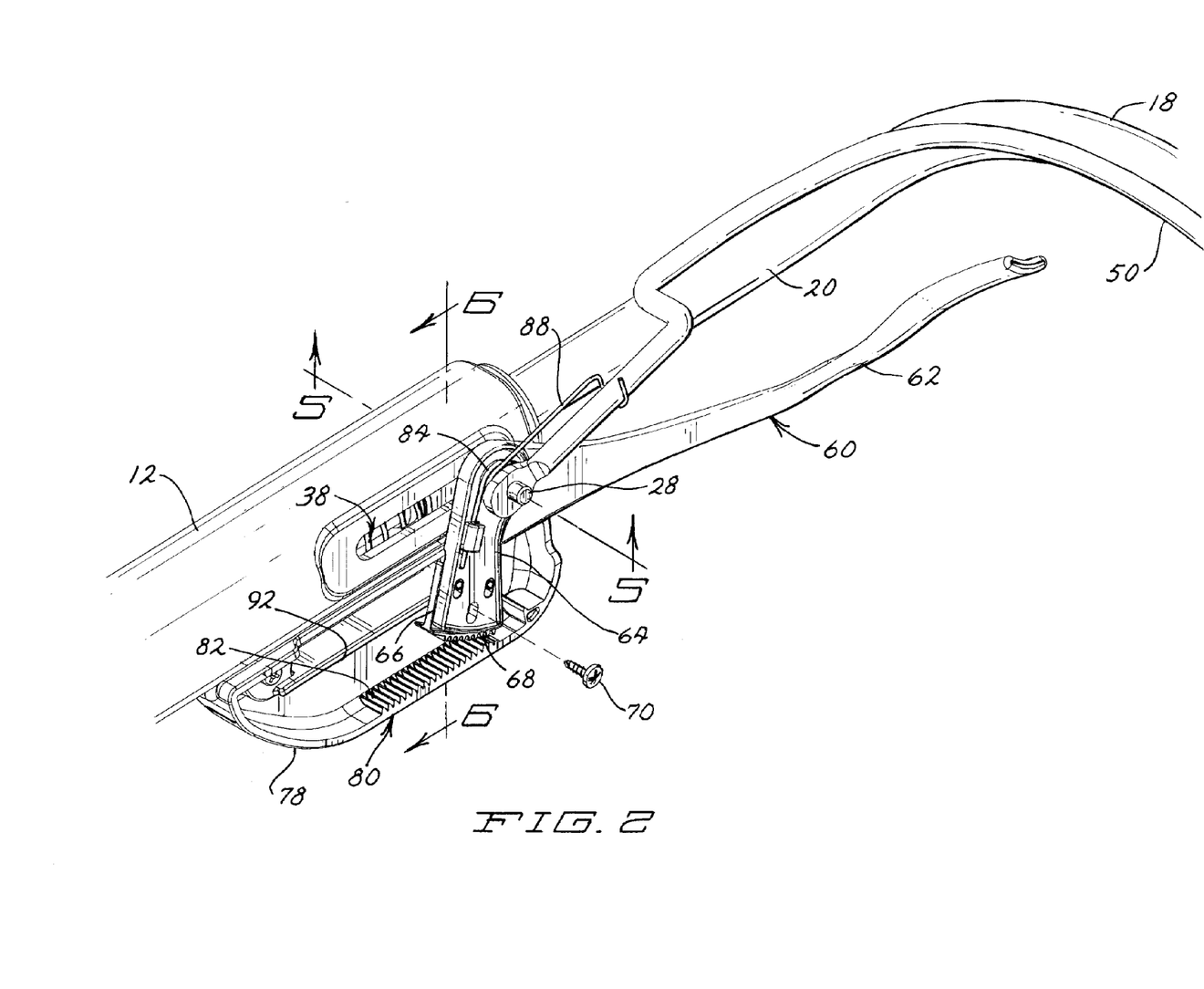
FIG. 2 is an enlarged perspective view of a portion of the ground speed control system of FIG. 1, particularly illustrating the slidable handle grip in its highest position with the self propel system being disengaged, the pivotal control lever in its non-operative position, and the blade control bail in its closed position to permit the engine to be started to allow operation of the blade.
Figure 8:
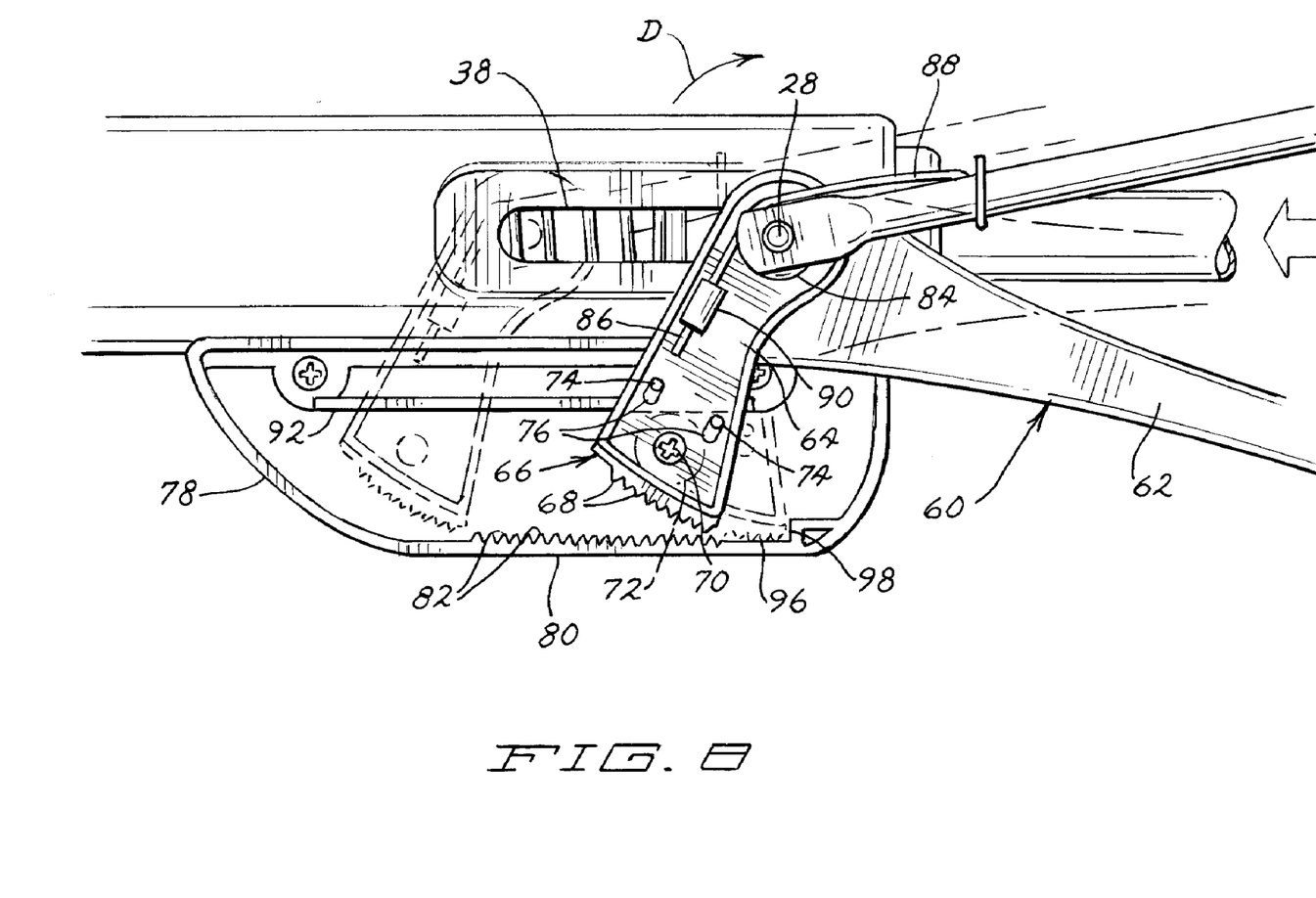
FIG. 8 is a side elevational view of a portion of the ground speed control system of FIG. 1, particularly illustrating the motion of the slidable handle grip on the handle but with the pivotal control lever remaining in its non-operative position.

Control system 2 of this invention further includes a pivotal control lever 60 mounted adjacent the other side of blade control bail 50 on the pivot pin 28 that mounts the opposite leg of blade control bail 50. Control lever 60 is mounted outboard of the adjacent leg of blade control bail 50 between the leg of blade control bail 50 and the side of handle tube 10. See FIG. 2. Control lever 60 is shaped like a bellcrank with a long lever arm 62 extending rearwardly of pivot pin 28 and a short lever arm 64 extending generally vertically downwardly from pivot pin 28 as shown in FIGS. 2 and 8. The short and long lever arms 62 and 64 of control lever 60 are integral with one another and move together.

A toothed sector gear 66 is adjustably attached to the bottom of short lever arm 64 of control lever 60. In effect, sector gear 66 simply provides teeth on the bottom of short lever arm 64 of control lever 60. Sector gear 66 is simply a truncated pie shaped member having a plurality of gear teeth 68 along the bottom edge thereof.

Sector gear 66 is fixed to short lever arm 64 of control lever 60 by an attachment screw 70 that passes through short lever arm 64 of control lever 60 into a threaded boss 72 provided on the backside of sector gear 66. Sector gear 66 is vertically adjustable on short lever arm 64 by virtue of two guide pins 74 provided on the front side of sector gear 66. Guide pins 74 extend into two slots 76 on short lever arm 64 of control lever 60. One can move sector gear 66 up and down on short lever arm 64 to precisely adjust the vertical position of teeth 68 by sliding guide pins 74 up and down in guide slots 76 before tightening attachment screw 70.

A housing 78 is provided on the same side of handle 8 as control lever 60 to provide another toothed member that cooperates with sector gear 66 of control lever 60. Housing 78 is simply bolted or attached to handle tube 10 adjacent control lever 60. As shown in FIG. 2, the inner side of housing 78 is open and the bottom of housing 78 includes an elongated toothed rack 80 formed thereon. The gear teeth 82 of rack 80 extend upwardly to selectively cooperate with the downwardly extending teeth 68 on sector gear 66. The cooperation between these two toothed members provides both a temporary speed increase or a cruise control function in a manner to be described hereafter.

A spring 84 is used to bias control lever 60 into a normally disengaged, non-operative position. Spring 84 is a torsion type spring having two spring fingers 86 and 88 extending outwardly from the central core of spring 84. The central core of spring 84 is coaxially arranged around pivot pin 28, one spring finger 86 is hooked beneath a lip 90 on short lever arm 64 of control lever 60, and the other spring finger 88 has a U-shaped end that is engaged underneath one leg of blade control bail 50. Spring 84 does not serve to bias blade control bail 50 to the disengaged position of blade control bail 50 as this is done by spring tension normally present on control cable 54 that is connected to blade control bail 50. Bail 50 simply serves as a convenient place to anchor spring finger 88 of spring 84.

In any event, spring 84 normally biases control lever 60 in the direction of the arrow D in FIG. 8. This pivots control lever 60 in the direction of the arrow D until boss 72 on the backside of sector gear 66 abuts against a longitudinal, downwardly facing surface 92 provided in housing 78. Boss 72 acts as a stop to define the non-operative position of control lever 60. In this position, the teeth 68 of sector gear 66 are not in contact with the teeth 82 of rack 80 but are spaced a short distance above the teeth 82 of rack 80 as shown in FIG. 8.

As further shown in FIG. 8, normal and usual operation of handle grip 6 to vary the ground speed of mower 4 has no effect on control lever 60. The operator can push in on handle grip 6 to cause the self propel system to engage and to drive mower 4, but control lever 60 remains in its non-operative position over the entire range of motion of handle grip 6. Note that the position of control lever 60 and sector gear 66 remain the same both in the solid and the phantom line position that is furthest to the left in FIG. 8 corresponding to a disengaged, zero speed position of handle grip 6 and to an engaged, maximum speed of handle grip 6. Control lever 60 will have no effect on handle grip 6 unless the operator consciously pivots control lever 60 to an engaged position.

Figure 9A:
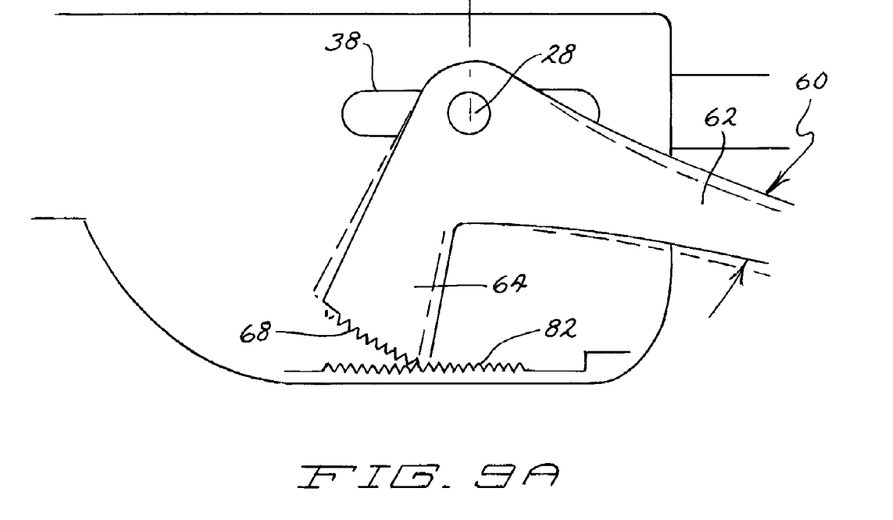
FIG. 9A is a diagrammatic operational view of a portion of the ground speed control system of FIG. 1, particularly illustrating the pivotal control lever being pivoted to move into its operative position in which a sector gear on the control lever engages a toothed rack on one of the handle tubes of the handle.
Figure 9B:
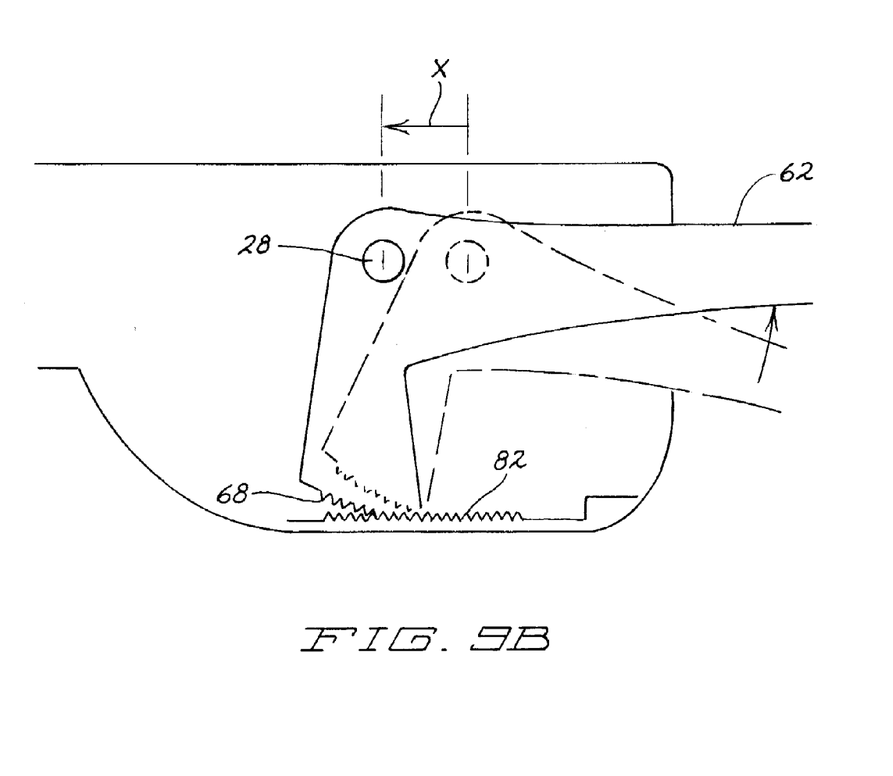
FIG. 9B is a diagrammatic operational view similar to FIG. 9A, particularly illustrating the pivotal control lever being further pivoted while in its rack engaging position to cam or push the slidable handle grip further forwardly to temporarily increase the mower ground speed or to provide a locked cruise control setting for the mower ground speed.

The operator can selectively use control lever 60 by squeezing long lever arm 62 upwardly as indicated by the arrow E in FIG. 3 until long lever arm 62 is squeezed up generally against the underside of handle grip 6. Long lever arm 62 can be contoured to smoothly nest with a portion of the underside of handle grip 6. This pivoting of control lever 60 moves control lever 60 from a non-operative position to an engaged or operative position. This is best described by referring to FIGS. 9A and 9B. FIGS. 9A and 9B depict handle grip 6 having been advanced to some intermediate position where the self propel system is engaged and mower 4 is being propelled over the ground at a selected speed.

Referring first to FIG. 9A and with handle grip 6 being in the intermediate position described above, the initial pivoting of long lever arm 62 of control lever 60 will engage the teeth 68 on sector gear 66 with the teeth 82 on rack 80 as short lever arm 64 pivots in the same direction. In other words, the initial pivoting of control lever 60 swings the two sets of gear teeth 68 and 82 into engagement with one another. Then, as the operator squeezes control lever 60 fully closed against handle grip 6, the continued pivotal motion of sector gear 66 will cause handle grip 6 to slide or cam itself further forwardly. This is depicted in FIG. 9B. Note that the later stages of the pivoting motion of control lever 60 have moved the axis of pivot pins 28 on handle grip 6 from its initial position (shown in solid in FIG. 9A and in phantom in FIG. 9B) to a final position that is further forwardly (shown in solid in FIG. 9B) by a distance identified as x in FIG. 9B.

As noted above, the effect of this action by the operator, namely the action of squeezing control lever 60 closed against the underside of handle grip 6, is to incrementally advance handle grip 6 further forwardly to provide an increase in the ground speed of mower 4. This is done without the operator needing to adjust the force the operator uses to push in on handle grip 6 itself. This speed boost is particularly useful when the ground speed of mower 4 tends to fall off. To counteract, the operator can simply close control lever 60 to temporarily increase the speed. Then, the operator need only release control lever 60 to end the temporary speed increase.

Another feature provided by control lever 60 is that control lever 60 when fully closed will lock handle grip 6 in a fixed position due to the engagement of the teeth 68 of sector gear 66 with the teeth 82 of rack 80. This provides a "cruise control" function since handle grip 6 will then remain in the same position. Thus, once the operator has actuated control lever 60 and has established a desired mower ground speed, the operator can easily maintain that speed simply by keeping control lever 60 closed.

The toothed rack 80 in housing 78 is long enough and is appropriately positioned such that control lever 60 can be used to fix or lock the position of handle grip 6 when handle grip 6 has not engaged the self propel system. Referring to FIG. 8, when handle grip 6 has not been slid downwardly at all on handle tubes 10 and the self propel system is disengaged, the beginning of the teeth 68 on sector gear 66 are generally aligned with and overlie the beginning of the teeth 82 on rack 80 as shown in the solid line position in FIG. 8. There is an empty space 96 in housing 78 forwardly of rack 80, i.e. between the beginning of the teeth 82 on rack 80 and a fixed abutment 98 on housing 78. If control lever 60 is then closed in this position of handle grip 6, sector gear 66 and the teeth 68 thereon swing down into empty space 96 in advance of rack 80 until short lever arm 64 hits against abutment 98. This is shown in the phantom line position in FIG. 8 that is furthest to the right.

In closing control lever 60 in this disengaged position of handle grip 6, the last few teeth 68 on sector gear 66 are moved either into engagement with the first few teeth 82 on rack 80 or are placed immediately in advance of the first few 82 teeth on rack 80. If the user were then to attempt to push in on handle grip 6, this motion would now be prevented by the engagement of the last few teeth 68 on rack 80 with the first few teeth 82 on rack 80. This would "lock-out" the sliding motion of handle grip 6 to prevent the self propel system from being engaged.

Use of control lever 60 to lockout the sliding action of handle grip 6 entirely is useful for some people when attempting to start mower 4. The operator can squeeze both blade control bail 50 and control lever 60 closed against handle grip 6 with one hand and then use the operator's other hand to pull on the engine start rope. Since handle grip 6 is prevented from moving, handle 8 will essentially be rigid during the engine starting process. This lockout feature can be also be used even with the engine running when doing close trimming around bushes, trees or other fixed objects and non driven operation of mower 4 is preferred.

A single pivotal control lever 60 as disclosed herein gives the operator numerous features as described above. If control lever 60 is closed when handle grip 6 is advanced out of its disengaged position and the self-propel system is actuated, control lever 60 will provide both a temporary speed boost and will maintain the ground speed of mower 4 to provide "cruise control". If control lever 60 is closed when handle grip 6 has not been advanced, control lever 60 prevents any sliding motion of handle grip 6 to keep the self propel system from being engaged to provide a "lockout" feature.

In addition, control system 2 of this invention is economical, compact and extremely clean in design. Handle grip 6 is a simple U-shaped handle grip with lower ends 22 of legs 20 of handle grip 6 simply riding in hollow upper ends 12 of handle tubes 10. A set of aligned pivot pins 28 stick out through slots 38 in handle tubes 10 and are used to mount all the other operative components of control system 2, both the pivotal blade control bail 50 as well as control lever 60 itself. The same pivot pins 28 affix lower ends 22 of legs 20 of handle grip 6 to the guide sleeves 24 used inside upper ends 12. Simple compression springs 40 are used in upper ends 12 between upper ends 12 and shoulders 34 on guide sleeves 24 to provide a balanced upward biasing force moving handle grip 6 into a disengaged position.

Various modifications of this invention will be apparent to those skilled in the art. Accordingly, the invention is to be limited only the by the appended claims.

We claim:

1. An improved outdoor power equipment unit having a self propel system for propelling the outdoor power equipment unit at a variable ground speed, the outdoor power equipment unit including a ground speed control system comprising a handle grip that moves in opposed directions for increasing and decreasing, respectively, the speed provided by the self propel system, wherein the improvement relates to the ground speed control system and comprises:
   a control other than the handle grip, wherein the control is selectively actuated by an operator for further advancing the movable handle grip in the speed increasing direction of movement thereof to temporarily increase the ground speed as long as the control remains actuated.

2. The outdoor power equipment unit of claim 1, wherein the outdoor power equipment unit includes an upwardly extending handle which carries the handle grip, and wherein the handle grip is movable in the opposed directions by being slidable on the handle in the opposed directions.

3. The outdoor power equipment unit of claim 1, wherein the handle grip includes a transverse cross bar that is sufficiently long to allow both of the operator's hands to grip the cross bar.

4. The outdoor power equipment unit of claim 1, wherein the control comprises a hand operated control.

5. The outdoor power equipment unit of claim 1, wherein the control is mounted on the movable handle grip.

6. The outdoor power equipment unit of claim 1, wherein the control comprises a pivotal lever.

7. The outdoor power equipment unit of claim 6, wherein the pivotal lever is actuated by pivoting the lever towards the movable handle grip.

8. The outdoor power equipment unit of claim 7, wherein the pivotal lever is mounted on the movable handle grip.

9. The outdoor power equipment unit of claim 1, wherein the control carries a first toothed member that cooperates with a second toothed member when the control is actuated, the cooperation between the first and second toothed members producing the temporary speed increasing advancement of the handle grip.

10. The outdoor power equipment unit of claim 9, wherein the control including the first toothed member is mounted on the movable handle grip and the second toothed member is mounted on a component of the mower other than the handle grip.

11. The outdoor power equipment unit of claim 10, wherein the second toothed member is mounted on an upwardly extending handle of the outdoor power equipment unit.

12. The outdoor power equipment unit of claim 9, wherein the control comprises a pivotal lever.

13. The outdoor power equipment unit of claim 1, wherein the control is accessible to the operator to allow the operator to make contact with and directly move the control to selectively actuate the control.

14. An improved outdoor power equipment unit having a self propel system for propelling the outdoor power equipment unit at a variable ground speed, the outdoor power equipment unit including an upwardly extending handle having a handle grip that is gripped by an operator to guide the outdoor power equipment unit, the outdoor power equipment unit including a ground speed control system in which the handle grip slides up and down on the handle to decrease and increase, respectively, the ground speed, wherein the improvement relates to the ground speed control system and comprises:
   (a) a first toothed member on the handle grip;
   (b) a second toothed member on the handle;
   (c) wherein the toothed members are normally disengaged from one another as the operator slides the handle grip up and down on the handle; and
   (d) wherein the toothed members are selectively engageable with one another and rotatable relative to one another by the operator to further slide the handle grip down the handle.

15. The outdoor power equipment unit of claim 14, wherein the first toothed member is carded on a lever pivotally mounted on the handle grip.

16. The outdoor power equipment unit of claim 15, wherein the lever is formed as a bellcrank with first and second lever arms, wherein the first toothed member is carried on the first lever arm and the second lever arm is in a position to be squeezed closed by the operator towards the handle grip to pivot the first lever arm and the first toothed member towards and into engagement with the second toothed member.

17. The outdoor power equipment unit of claim 15, wherein the second toothed member comprises a toothed rack carried on the handle.

18. The outdoor power equipment unit of claim 15, wherein the lever is spring biased into a non-operative position in which the first and second toothed members are disengaged from one another.

19. An improved outdoor power equipment unit having a self propel system for propelling the outdoor power equipment unit at a variable ground speed, the outdoor power equipment unit including an upwardly extending handle having a handle grip that is gripped by an operator to guide the outdoor power equipment unit, the outdoor power equipment unit including a ground speed control system in which the handle grip slides up and down on the handle to decrease and increase, respectively, the ground speed, wherein the improvement relates to the ground speed control system and comprises:

(a) a pivotal lever carried on the handle grip with the pivotal lever having a set of teeth thereon;
(b) a toothed rack carried on the handle with the teeth on the rack and the teeth on the lever facing one another, the teeth on the rack and the teeth on the lever being configured to mate with one another;
(c) the pivotal lever having a non-operative position in which the teeth on the pivotal lever are displaced from the teeth on the rack as the operator slides the handle grip up and down on the handle; and
(d) wherein the operator can selectively pivot the lever on the handle grip into an operative position as the operator slides the handle grip up and down on the handle with pivotal motion of the lever moving the teeth on the lever into engagement with the teeth on the rack such that the teeth on the lever and the teeth on the rack cooperate with one another to provide an additional influence on movement of the handle grip.

20. The outdoor power equipment unit of claim 19, wherein the additional influence on movement of the handle grip comprises further sliding the handle grip down the handle to provide a temporary speed increase as long as the lever remains in the operative position.

21. The outdoor power equipment unit of claim 19, wherein the additional influence on movement of the handle grip comprises locking the handle grip against sliding on the handle as long as the lever remains in the operative position.

22. The outdoor power equipment unit of claim 19, further including a spring for biasing the lever into the non-operative position.

* * * * *

UNITED STATES PATENT AND TRADEMARK OFFICE
CERTIFICATE OF CORRECTION

PATENT NO. : 7,540,131 B2  
APPLICATION NO. : 10/942625  
DATED : June 2, 2009  
INVENTOR(S) : Dale A. Stover et al.

It is certified that error appears in the above-identified patent and that said Letters Patent is hereby corrected as shown below:

Col. 10, Line 40, change "carded" to --carried--.

Signed and Sealed this

Twenty-fifth Day of August, 2009

David J. Kappos
*Director of the United States Patent and Trademark Office*